(12) United States Patent
Schroeder et al.

(10) Patent No.: US 11,390,371 B2
(45) Date of Patent: Jul. 19, 2022

(54) CONTROL VANE ORIENTATION FOR DUCTED-ROTOR AIRCRAFT

(71) Applicant: Bell Textron Inc., Fort Worth, TX (US)

(72) Inventors: Karl Schroeder, Southlake, TX (US); William Anthony Amante, Grapevine, TX (US); Kip Gregory Campbell, Hurst, TX (US)

(73) Assignee: Textron Innovations Inc., Providence, RI (US)

( * ) Notice: Subject to any disclaimer, the term of this patent is extended or adjusted under 35 U.S.C. 154(b) by 225 days.

(21) Appl. No.: 16/732,052

(22) Filed: Dec. 31, 2019

(65) Prior Publication Data

US 2021/0197953 A1 Jul. 1, 2021

(51) Int. Cl.
*B64C 9/02* (2006.01)
*B64C 29/00* (2006.01)

(52) U.S. Cl.
CPC ............ *B64C 9/02* (2013.01); *B64C 29/0033* (2013.01)

(58) Field of Classification Search
CPC ........... B64C 9/02; B64C 11/001; B64C 5/10; B64C 29/0033; B64C 15/02; B64C 29/0066; B64C 2027/8272
See application file for complete search history.

(56) References Cited

U.S. PATENT DOCUMENTS

| | | | | |
|---|---|---|---|---|
| 5,419,514 A | * | 5/1995 | Ducan | B64C 29/0033 244/12.4 |
| 2009/0266941 A1 | * | 10/2009 | Karem | B64C 3/185 244/7 A |
| 2015/0314865 A1 | * | 11/2015 | Bermond | B64C 29/0033 244/17.27 |

FOREIGN PATENT DOCUMENTS

CN 106927023 A * 7/2017
WO WO-2019116101 A1 * 6/2019 ............ B64C 29/02

* cited by examiner

*Primary Examiner* — Richard R. Green
*Assistant Examiner* — William L Gmoser
(74) *Attorney, Agent, or Firm* — Lightfoot & Alford PLLC

(57) ABSTRACT

A ducted-rotor aircraft may include a fuselage and first and second ducts that are coupled to the fuselage at respective first and second locations. The first location may be on a first side of a fuselage of the aircraft and spaced from a nominal yaw axis of the aircraft. The second location may be on an opposed second side of the fuselage and spaced from the nominal yaw axis. Each duct may include a rotor that is disposed in an opening that extends through the duct. Each rotor may include a plurality of blades. Each duct may further include a control vane that is mounted aft of the plurality of blades and that is pivotable about a vane axis that is oriented toward the nominal yaw axis.

16 Claims, 7 Drawing Sheets

CONTROL VANE ORIENTATION FOR DUCTED-ROTOR AIRCRAFT

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Aircraft that are configured for vertical takeoff and landing may be convertible between a helicopter mode that is used for takeoff, landing and hovering, and an airplane mode that is used for forward flight. Such aircraft may be configured with one or more repositionable ducted rotors that provide lift and propulsion forces. When operating in helicopter mode, yaw control of a ducted-rotor aircraft with distributed propulsion can be problematic, for instance in windy conditions. Yaw control problems in such ducted-rotor aircraft may be exacerbated by stabilizer and/or ducted rotor surfaces, in addition to fuselage surfaces, that generate wind forces in respective directions.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

It is desirable to maximize the respective moment arms generated by control surfaces of the ducted rotors of such aircraft, in order to produce optimal yaw control. The orientation of control surfaces to produce optimal yaw control is disclosed herein for use in aircraft such as ducted-rotor aircraft.

Figure 1:
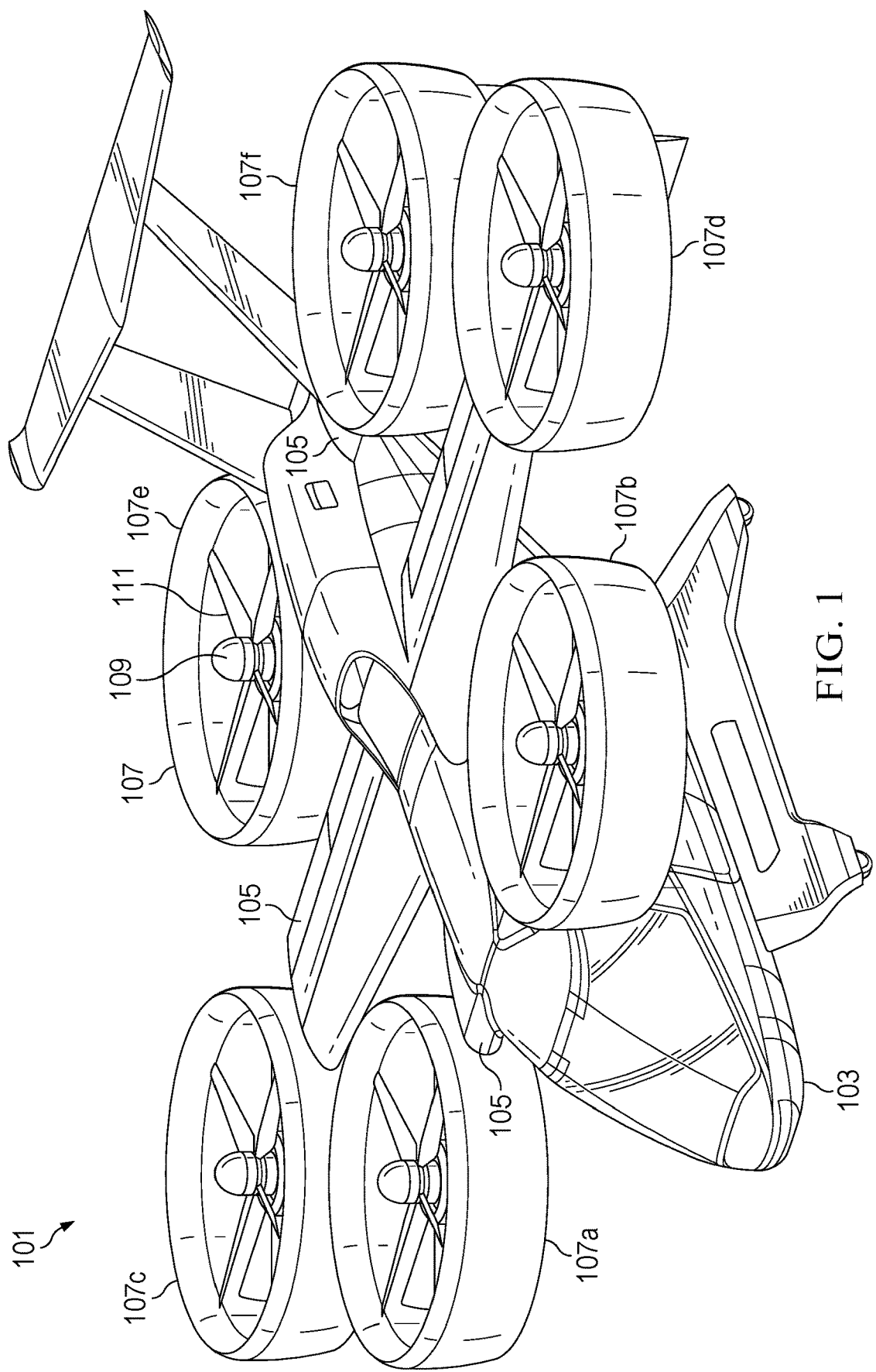
FIG. 1 is an oblique view of an aircraft with ducted rotors, with the ducted rotors configured for the aircraft to operate in a helicopter mode.
Figure 2:
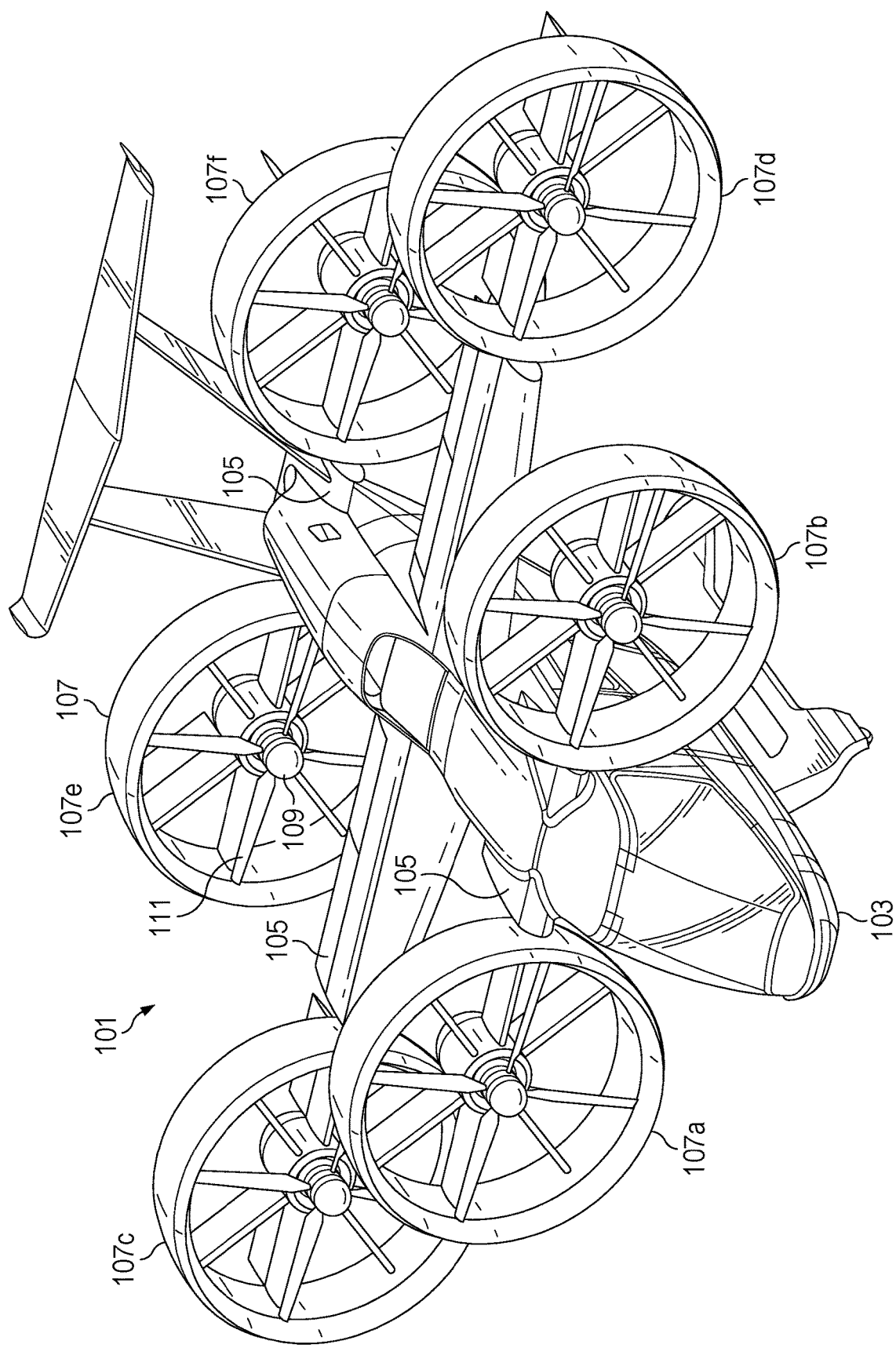
FIG. 2 is an oblique view the aircraft depicted in FIG. 1, with the ducted rotors configured for the aircraft to operate in an airplane mode.

FIGS. 1 and 2 are oblique views of a ducted-rotor aircraft 101. Aircraft 101 comprises a fuselage 103 with a plurality of fixed wings 105 extending therefrom and a plurality of rotatable ducts 107. As shown, a duct 107 is located at an end of each wing 105. Each duct 107 houses a power plant for driving an attached rotor 109 in rotation. Each rotor 109 has a plurality of blades 111 configured to rotate within ducts 107.

The position of ducts 107, and optionally the pitch of blades 111, can be selectively controlled to control direction, thrust, and lift of rotors 109. For example, ducts 107 are repositionable to convert aircraft 101 between a helicopter mode and an airplane mode. As shown in FIG. 1, ducts 107 are positioned such that aircraft 101 is in helicopter mode, which allows for vertical takeoff and landing, hovering, and low-speed directional movement. As shown in FIG. 2, ducts 107 are positioned such that aircraft 101 is in airplane mode, which allows for high-speed forward-flight. In this embodiment, aircraft 101 is configured with six ducts 107, including two ducts 107a and 107b that form a forward pair of ducts, two ducts 107c and 107d that form a central pair of ducts, and two ducts 107e and 107f that form an aft pair of ducts. It should be appreciated that aircraft 101 is not limited to the illustrated configuration having six ducts 107, and that aircraft 101 may alternatively be implemented with more or fewer ducts 107.

Figure 3:
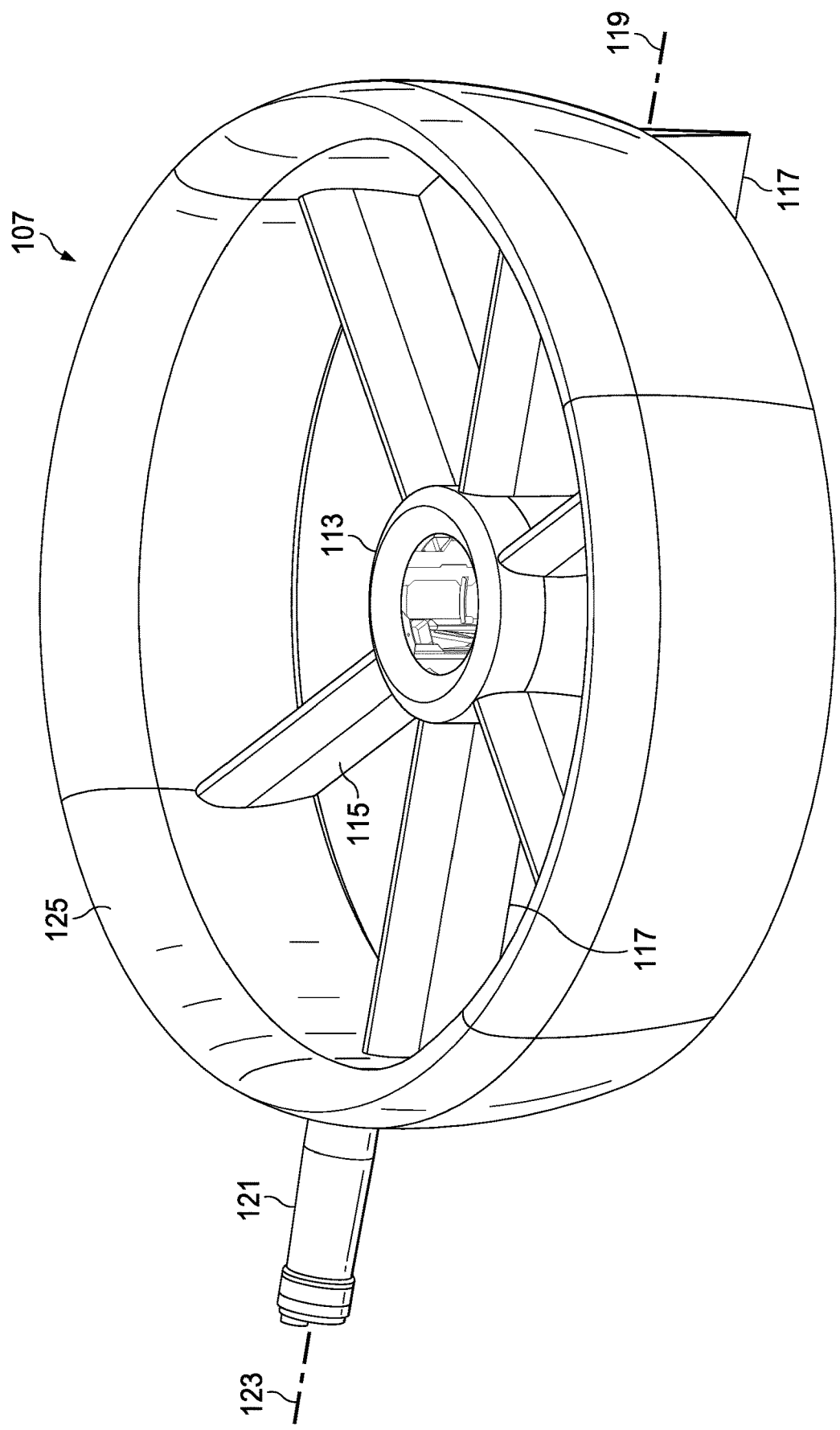
FIG. 3 is an oblique view of a duct of the aircraft depicted in FIG. 1.

FIG. 3 is an oblique view of a duct 107 of aircraft 101. Duct 107 is depicted in FIG. 3 without rotor 109. Duct 107 includes a central hub 113 that is configured to receive a rotor 109 and/or other components. Duct 107 further includes a plurality of stators 115 that extend outwardly from the hub 113. Duct 107 includes six stators 115 that extend radially outward from hub 113. As shown, stators 115 are unequally spaced about hub 113. It should be appreciated that duct 107 may be alternatively configured with more or fewer stators 115. It should further be appreciated that duct 107 may be alternatively configured with different spacing of stators 115 about hub 113.

Duct 107 further includes a pair of control vanes 117 that are pivotally attached to respective stators 115. Each pair of control vanes 117 is pivotable about a respective vane axis 119. Control vanes 117 may be rotated to facilitate yaw control, changes of direction, turning, etc. during flight of aircraft 101. Duct 107 further includes a spindle 121 that extends outward from and that facilitates pivotable attachment of duct 107 to a corresponding wing 105 of aircraft 101. In this regard, spindle 121 rotatably couples duct 107 to fuselage 103. Spindle 121 is pivotable about a spindle axis 123, for example when duct 107 is rotated to convert aircraft 101 between helicopter mode and airplane mode. Duct 107 may include one or more sections of cowling 125 that form an aerodynamic outer skin of duct 107, and that define an opening that extends through duct 107. As shown, hub 113 is at least partially disposed within the opening.

Figure 4:
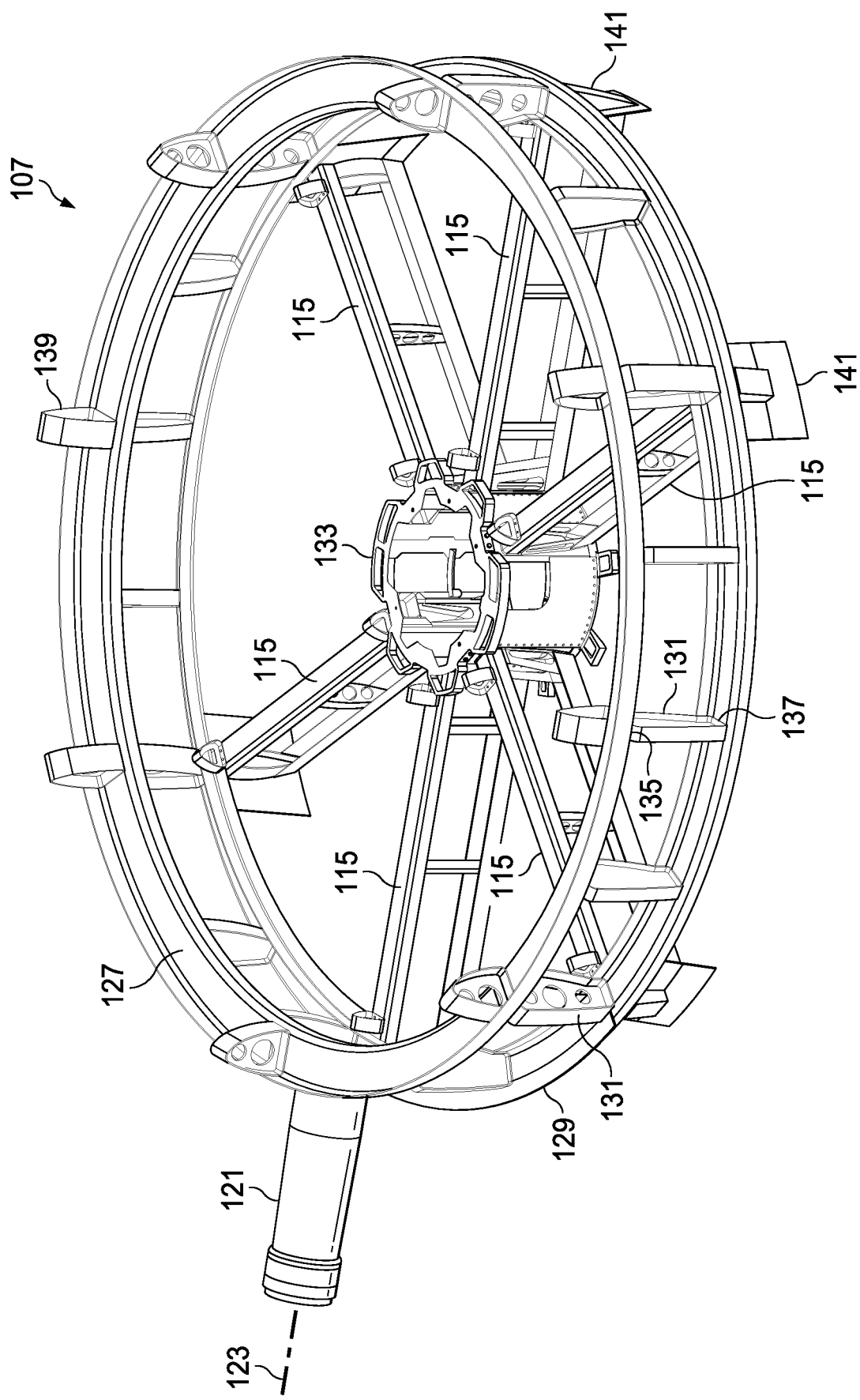
FIG. 4 is an oblique view of the duct depicted in FIG. 2, with an outer skin of the duct removed to illustrate internal components of the duct.

FIG. 4 is an oblique view of duct 107 with cowling 125 removed to illustrate inner components of duct 107, and with no control vanes 117 attached. Duct 107 has a structural framework comprised of structural members. Included among structural members of duct 107 are stators 115, spindle 121, an annular forward spar 127, an annular aft spar 129, a plurality of ribs 131, and an inner hub assembly 133. Hub assembly 133 is configured for the attachment of a motor (not shown) thereto that drives rotor 109, and configured to facilitate the attachment of other components of duct 107 thereto, such as stators 115, mechanisms for causing control vanes 117 to rotate, and so on.

Each rib 131 defines an upper end 135 and an opposed lower end 137. The upper end 135 of each rib 131 is configured to attach to forward spar 127, and the lower end 137 of each rib 131 is configured to attach to aft spar 129. As shown, ribs 131 may be configured with differing geometries. For example, respective ribs 131 positioned above the ends of stators 115 may be wider than the remaining ribs 131 and may define one or more apertures that extend therethrough. It should be appreciated that duct 107 is not limited to the illustrated configuration of ribs 131. For example, duct 107 may be implemented with more or fewer ribs and/or with ribs having the same or different geometries as compared to ribs 131.

In this embodiment, the structural members of duct 107 further include braces 139 and stator brackets 141. Braces 139 are attached to forward spar 127 and are configured to support corresponding portions of cowling 125. As shown, braces 139 are spaced apart around forward spar 127, attached to forward spar 127 at locations above every other rib 131. Stator brackets 141 are attached to aft spar 129 at locations where stators 115 intersect aft spar 129. Stator brackets 141 are configured to facilitate attachment of respective ends of stators 115 to aft spar 129. As shown, stator brackets 141 may be configured with differing geometries. In this embodiment, each stator bracket 141 is fabricated as a single-piece component.

One or both of forward spar 127 and aft spar 129 may be constructed of composite material. In the instant disclosure, composite material preferably refers to plies of a fiber-reinforced plastic (FRP) composition that includes filament fibers, such as carbon fibers for example, embedded in a thermoset polymer matrix material such as a thermoplastic resin. Preferably the fibers within the plies are woven and the plies are pre-impregnated with resin. To illustrate, forward spar 127 and aft spar 129 may be constructed from one or more layered plies of carbon-fiber-reinforced plastic (CFRP). It should be appreciated that duct 107 is not limited to an implementation having two spars such as forward spar 127 and aft spar 129. For example, duct 107 may be alternatively implemented with more or fewer spars.

Figure 5:
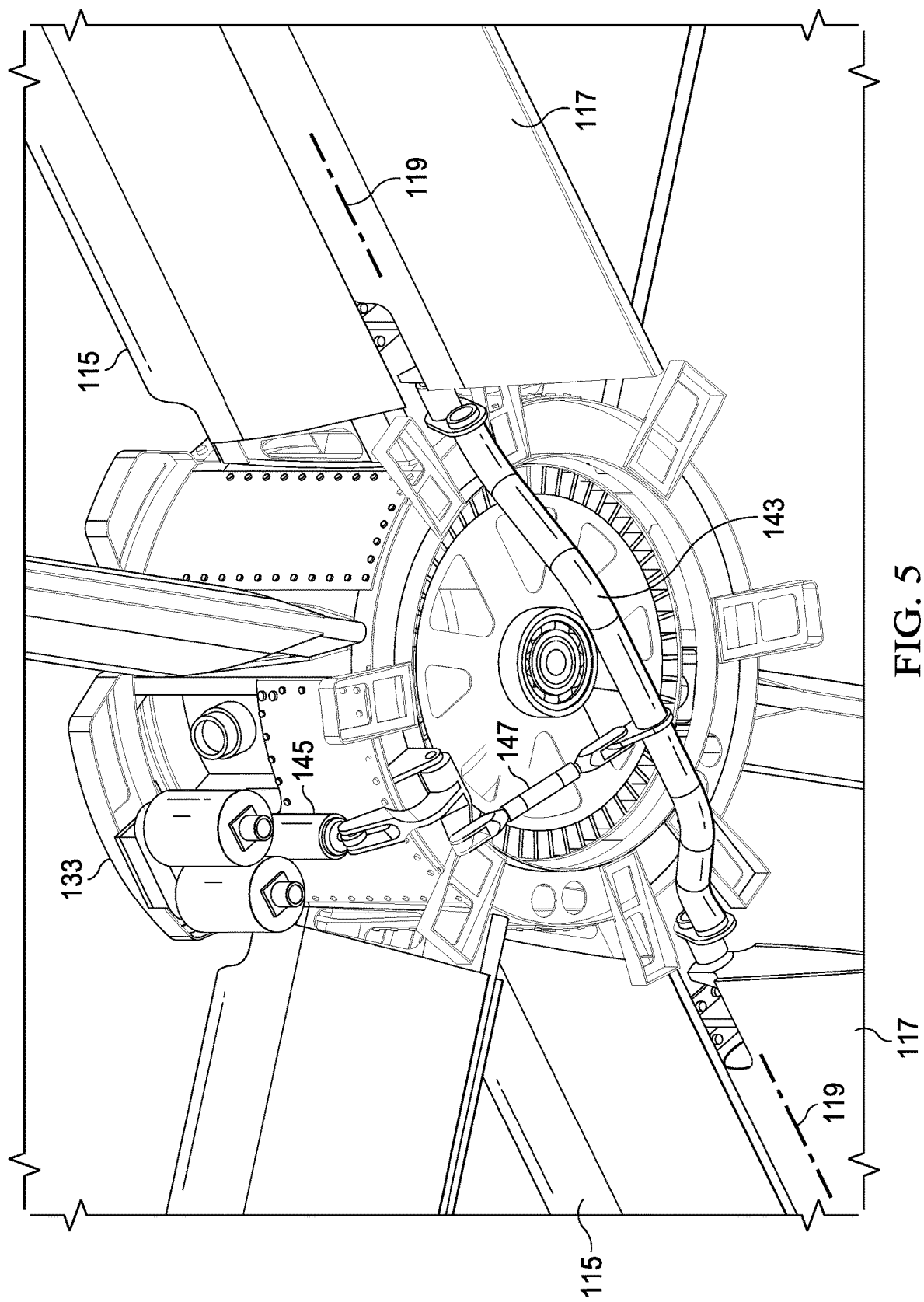
FIG. 5 is an oblique view of the underside of the duct depicted in FIG. 2, with the outer skin of the duct removed.

FIG. 5 is an oblique view of duct 107 with cowling 125 removed and with two control vanes 117 attached. As shown, each control vane 117 is attached to a respective stator 115. Control vanes 117 are mounted to rotate about a common vane axis 119. In this embodiment, control vanes 117 are linked together by a bell crank 143. Duct 107 further includes a linear actuator 145 that is attached to hub assembly 133 and a linkage 147 that operably couples linear actuator 145 to bell crank 143. Linear actuator 145 may be operated to, via linkage 147, cause control vanes 117 to rotate about vane axis 119. It should be appreciated that duct 107 is not limited to the illustrated mechanisms for causing control vanes 117 to rotate about vane axis 119.

When ducts 107 are positioned as shown in FIG. 2 with blades 111 of rotors 109 rotating, air will move into ducts 107 past forward spars 127 as rotors 109 generate thrust that causes aircraft 101 to move in a forward direction. As air moves through ducts 107 while blades 111 of rotors 109 are rotating, the air will move past aft spars 129 and be exhausted over control vanes 117 and away from ducts 107, for example in an aft direction as aircraft 101 moves in a forward direction. In this regard, control vanes 117 are mounted aft of blades 111 of rotors 109.

Figure 6:
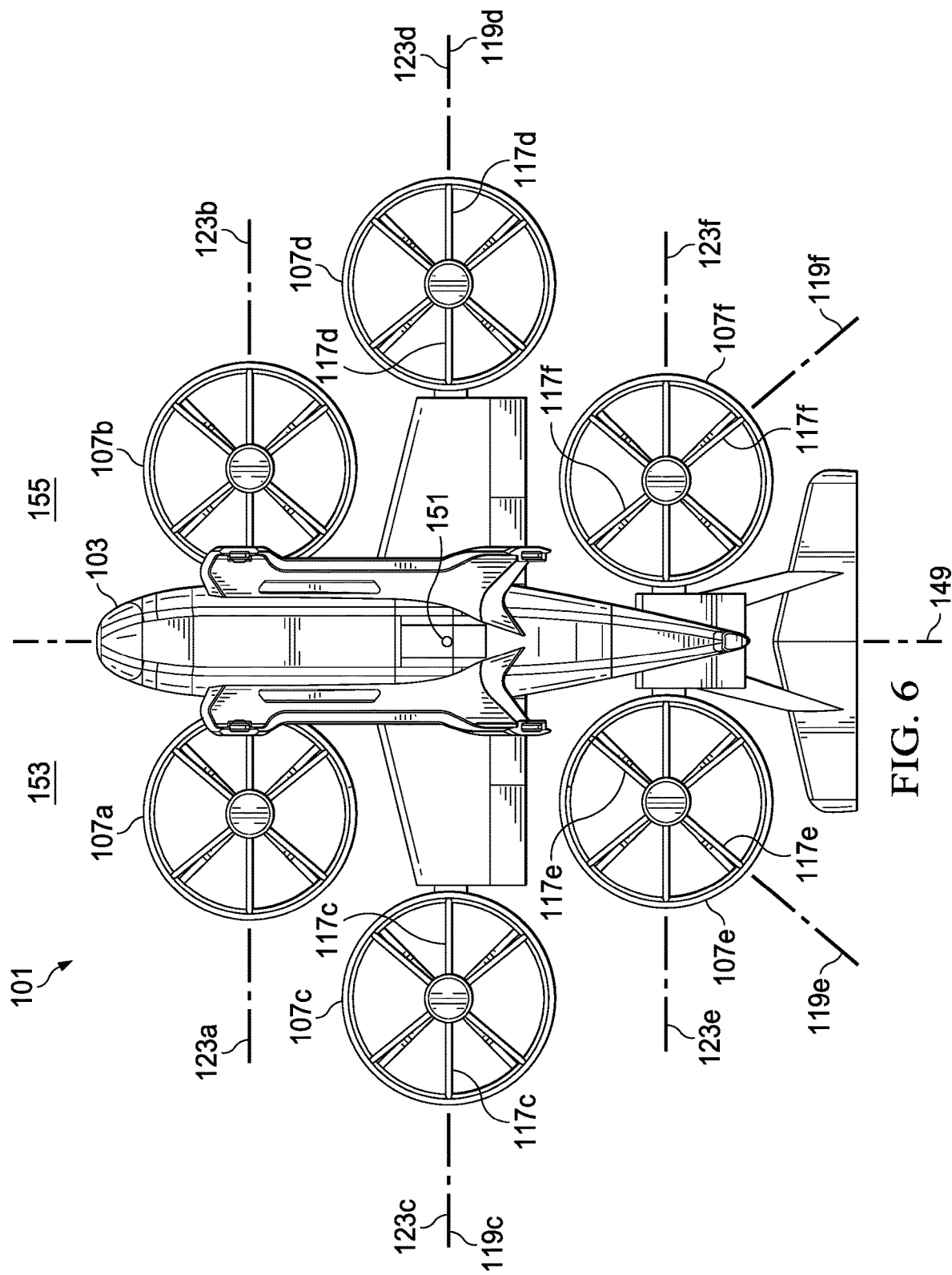
FIG. 6 is a bottom view of the aircraft depicted in FIG. 1.
Figure 7:
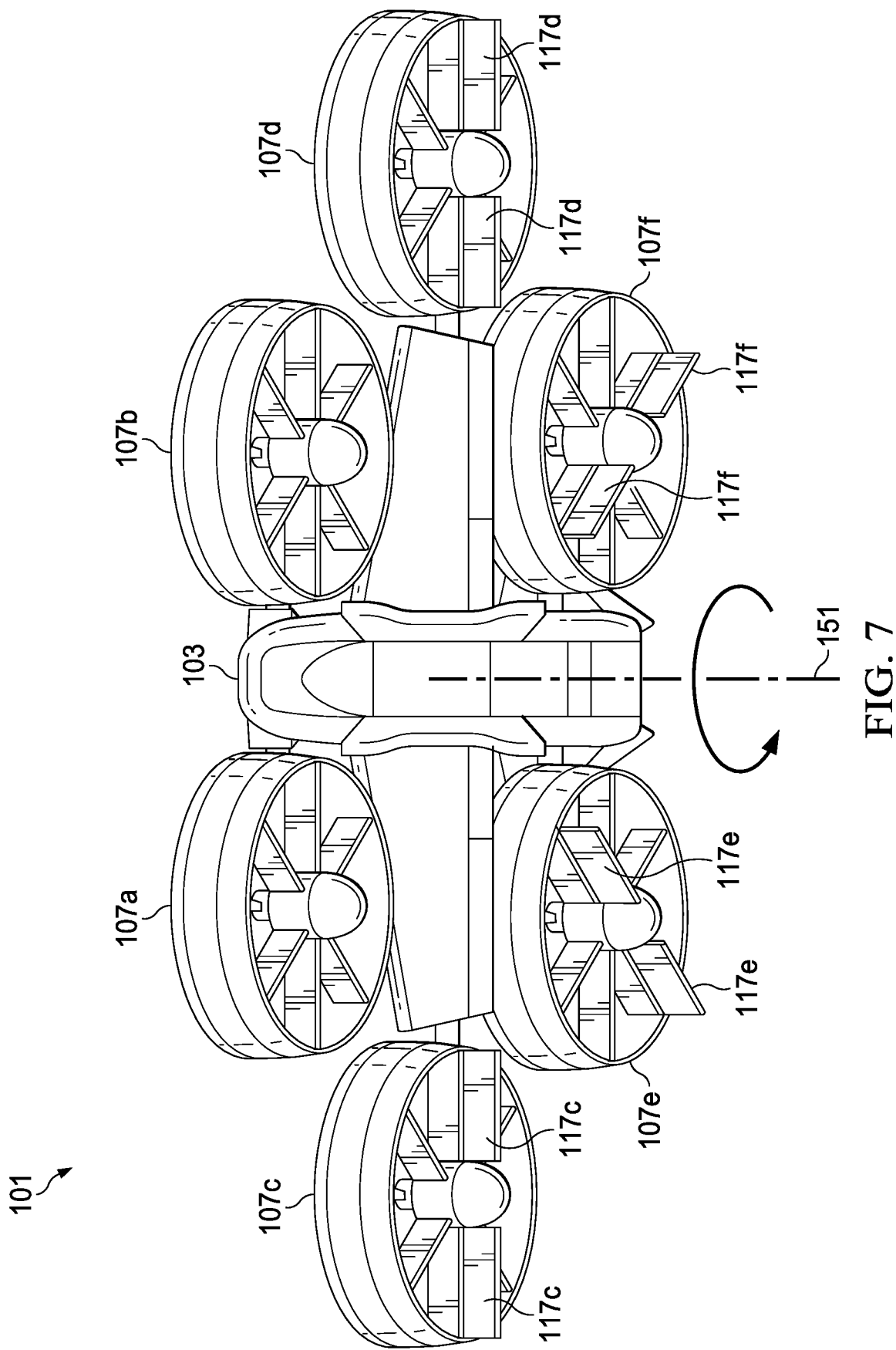
FIG. 7 is an oblique view of the aircraft depicted in FIG. 1, illustrating the orientation of control vanes attached to the ducted rotors.

FIG. 6 is a bottom view of aircraft 101 and FIG. 7 is an oblique view of the underside of aircraft 101. As shown, aircraft 101 is configured to roll about a nominal roll axis 149 that bisects aircraft 101 along a longitudinal direction and is configured to yaw about a nominal yaw axis 151 that extends through aircraft 101 in a vertical direction and is perpendicular to nominal roll axis 149. Nominal roll axis 149 and nominal yaw axis 151 intersect each other at a location that corresponds to a nominal center of gravity of aircraft 101. Yaw of aircraft 101 about nominal yaw axis 151 may be produced by operating one or more control surfaces of aircraft 101, such as one or more control vanes 117.

Each duct 107 is rotatable about a respective spindle axis 123, for example while aircraft 101 is converting between helicopter mode and airplane mode. More specifically, duct 107a is rotatable about spindle axis 123a, duct 107b is rotatable about spindle axis 123b, duct 107c is rotatable about spindle axis 123c, duct 107d is rotatable about spindle axis 123d, duct 107e is rotatable about spindle axis 123e, and duct 107f is rotatable about spindle axis 123f. Spindle axes 123a, 123b, 123c, 123d, 123e, and 123f extend perpendicular to nominal roll axis 149.

In this embodiment, ducts 107a, 107c, and 107e are coupled to fuselage 103 on a first side 153 of fuselage 103, spaced laterally from nominal roll axis 149 in a first direction, and ducts 107b, 107d, and 107f are coupled to fuselage 103 on an opposed second side 155 of fuselage 103, spaced laterally from nominal roll axis 149 in a second direction that is opposite the first direction. Each of ducts 107a, 107b, 107e, and 107f is laterally spaced equally from nominal roll axis 149. Each of ducts 107c and 107d is laterally spaced equally from nominal roll axis 149. Additionally, ducts 107c and 107d are laterally spaced further from nominal roll axis 149 than are ducts 107a, 107b, 107e, and 107f, such that ducts 107c and 107d are spaced further from fuselage 103 than are ducts 107a, 107b, 107e, and 107f. Stated differently, ducts 107c and 107d are spaced non-equidistantly from the nominal roll axis 149 relative to ducts 107a, 107b, 107e, and 107f.

Ducts 107 may be coupled to fuselage 103 at respective locations that are forward, aft, or longitudinally aligned with the nominal center of gravity of aircraft 101. In this embodiment, ducts 107a and 107b are coupled to fuselage 103 at respective locations that are spaced equidistantly forward of nominal yaw axis 151 and are spaced equidistantly in opposed directions from nominal roll axis 149. Therefore, spindle axes 123a and 123b are spaced forward from nominal yaw axis 151. Ducts 107c and 107d are coupled to fuselage 103 at respective locations that are longitudinally aligned with nominal yaw axis 151 and that are spaced equidistantly in opposed directions from nominal roll axis 149. Therefore, spindle axes 123c and 123d are longitudinally aligned with nominal yaw axis 151. Ducts 107e and 107f are coupled to fuselage 103 at respective locations that are spaced equidistantly rearward of nominal yaw axis 151 and are spaced equidistantly in opposed directions from nominal roll axis 149. Therefore, spindle axes 123e and 123f are spaced rearward from nominal yaw axis 151.

As shown, ducts 107a, 107c, and 107e are configured in an array that mirrors that of ducts 107b, 107d, and 107f through a plane that intersects both the nominal roll axis 149 and the nominal yaw axis 151. More specifically, ducts 107a and 107b are spaced equidistantly from nominal roll axis 149 and nominal yaw axis 151, ducts 107c and 107d are spaced equidistantly from nominal roll axis 149, and ducts 107e and 107f are spaced equidistantly from nominal roll axis 149 and nominal yaw axis 151. Additionally, spindle axis 123a extends parallel to spindle axis 123b, spindle axis 123c extends parallel to spindle axis 123d, and spindle axis 123e extends parallel to spindle axis 123f.

In this embodiment, aircraft 101 is equipped with four pairs of control vanes 117, with each pair of control vanes 117 mounted to a particular duct 107. More specifically, duct 107c includes two control vanes 117c mounted to respective opposed stators 115 and pivotable about a vane axis 119c, duct 107d includes two control vanes 117d mounted to respective opposed stators 115 and pivotable about a vane axis 119d, duct 107e includes two control vanes 117e mounted to respective opposed stators 115 and pivotable about a vane axis 119e, and duct 107f includes two control vanes 117f mounted to respective opposed stators 115 and pivotable about a vane axis 119f. In this embodiment, ducts 107a-107f are constructed similarly, such that two control vanes 117 may be mounted to any two opposed stators 115 of a particular duct 107. This common construction, which allows for multiple configurations, facilitates commonality in parts and manufacturing methods for ducts 107.

Ducts 107 having control vanes 117 with parallel vanes axes 119 are preferably configured to rotate in opposite directions relative to each other, through equal amounts of rotational displacement, when operated. For example, as shown vane axis 119c is parallel to vane axis 119d. Thus, when control vanes 117c rotate about vane axis 119c in a first direction, control vanes 117d rotate about vane axis 119d in a second direction that is opposite the first direction. Additionally, ducts 107 coupled to opposite sides of fuselage 103 are preferably configured to rotate in opposite directions relative to each other, through equal amounts of rotational displacement, when operated. For example, as shown control vanes 117c and 117e are mounted to ducts 107c and 107e respectively, which are coupled to first side 153 of fuselage 103 and control vanes 117d and 117f are mounted to ducts 107d and 107f respectively, which are coupled to second side 155 of fuselage 103. Thus, when control vanes 117c and 117e rotate about vane axes 119c and 119e respectively, in a first direction, control vanes 117d and 117f rotate about vane axes 119d and 119f respectively, in a second direction that is opposite the first direction.

Each of vane axes 119c, 119d, 119e, and 119f is oriented toward nominal yaw axis 151. As described herein, orienting preferably means, for example, aligning each vane axis 119 to point toward one or both of nominal yaw axis 151 and the nominal center of gravity of aircraft 101. Each vane axis 119 may be coincident with, or parallel to, a radial that extends from the nominal center of gravity of aircraft 101.

In this embodiment, vane axis 119c is parallel to vane axis 119d. Vane axis 119e is non-parallel to vane axis 119c and vane axis 119f is non-parallel to vane axis 119d. Therefore, vane axis 119e is angularly offset relative to vane axis 119c and vane axis 119f is angularly offset relative to vane axis 119d. Additionally, in this embodiment vane axis 119c is parallel to spindle axis 123c and vane axis 119d is parallel to spindle axis 123d.

The orientation of the vane axis 119 of a particular control vane 117 plays a significant role in the effectiveness of that control vane 117 to control yaw of aircraft 101, for example when aircraft 101 is hovering in helicopter mode. Orienting each of vane axes 119c, 119d, 119e, and 119f to align toward the nominal yaw axis 151 of aircraft 101 can maximize the respective moment arms generated for yaw control by each of control vanes 117c, 117d, 117e, and 117f when aircraft 101 is operating in helicopter mode. However, it should be appreciated that one or more of control vanes 117c, 117d, 117e, and 117f can also be operated to control yaw, pitch, and/or roll of aircraft 101 during forward flight when aircraft 101 is in airplane mode.

It should further be appreciated that aircraft 101 is not limited to the illustrated configuration of ducts 107 and control vanes 117. For example, in an alternative configuration of aircraft 101 ducts 107a and 107b may have control vanes 117 mounted thereto, with respective vane axes 119 of those control vanes oriented toward the nominal yaw axis 151. Furthermore, aircraft 101 may be alternatively configured with more or fewer ducts 107 and/or with more or fewer control vanes 117. Such alternative embodiments may be configured with spacing of ducts 107 from the nominal roll axis 149 and/or nominal yaw axis 151 that is the same or different from those illustrated. It should further still be appreciated that orienting vane axes 119c, 119d, 119e, and 119f toward nominal yaw axis 151 should not be limited to precise alignment of each vane axis 119 with nominal yaw axis 151. For example, orienting vane axes 119c, 119d, 119e, and 119f toward nominal yaw axis 151 may include orienting one or more of vane axes 119c, 119d, 119e, and 119f toward a volumetric region, such as a sphere, that encloses a portion of nominal yaw axis 151 proximate to the nominal center of gravity of aircraft 101 and that may enclose the nominal center of gravity of aircraft 101.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, ... 50 percent, 51 percent, 52 percent, ..., 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A ducted-rotor aircraft comprising:
   a fuselage; and
   first and second ducts coupled to the fuselage, the first and second ducts located on opposed sides of the fuselage and spaced from a nominal yaw axis of the aircraft, each duct comprising:
      a rotor that is disposed in an opening that extends through the duct, the rotor having a plurality of blades; and
      a control vane that is mounted aft of the plurality of blades and is pivotable about a vane axis;
   wherein the first and second ducts are rotatably coupled to the fuselage and each pivotable about an associated pivot axis between a first position, in which thrust from the associated duct is directed downward, and a second position, in which the thrust is directed rearward, each pivot axis being perpendicular to a longitudinal axis of the aircraft and located in a plane that bisects the associated duct;
   wherein the first and second ducts are located forward or rearward of the nominal yaw axis, and
   wherein the vane axis of each of the first and second ducts is oriented toward the nominal yaw axis when the first and second ducts are in the first position.

2. The ducted-rotor aircraft of claim 1, wherein the first and second ducts are spaced equidistantly rearward from the nominal yaw axis.

3. The ducted-rotor aircraft of claim 1, further comprising:
   a third duct coupled to the fuselage, the third duct comprising:
      a rotor that is disposed in an opening that extends through the duct, the rotor having a plurality of blades; and
      a control vane that is mounted aft of the plurality of blades and is pivotable about a vane axis,
   wherein the vane axis of the third duct is oriented toward the nominal yaw axis of the aircraft.

4. The ducted-rotor aircraft of claim 3, further comprising:
   a fourth duct coupled to the fuselage, the fourth duct comprising:
      a rotor that is disposed in an opening that extends through the duct, the rotor having a plurality of blades; and
      a control vane that is mounted aft of the plurality of blades and is pivotable about a vane axis,
   wherein the vane axis of the fourth duct is oriented toward the nominal yaw axis of the aircraft, and
   wherein the third and fourth ducts are located on opposed sides of the fuselage.

5. The ducted-rotor aircraft of claim 4, wherein the third and fourth ducts are located forward of the nominal yaw axis.

6. The ducted-rotor aircraft of claim 5, wherein the third and fourth ducts are spaced equidistantly forward from the nominal yaw axis.

7. The ducted-rotor aircraft of claim 4, wherein the first and third ducts are laterally spaced equidistantly from a nominal roll axis of the aircraft relative to each other, and
   wherein the second and fourth ducts are laterally spaced equidistantly from the nominal roll axis relative to each other.

8. The ducted-rotor aircraft of claim 4, wherein the first and third ducts are laterally spaced non-equidistantly from a nominal roll axis of the aircraft relative to each other, and
   wherein the second and fourth ducts are laterally spaced non-equidistantly from the nominal roll axis relative to each other.

9. The ducted-rotor aircraft of claim 4, wherein the third and fourth ducts are rotatably coupled to the fuselage.

10. A duct for a ducted-rotor aircraft, the duct comprising:
    a cowling that defines an annular opening that extends through the duct;
    a spindle that extends outward from the cowling and is configured for rotatably coupling the cowling to a fuselage of the aircraft, the spindle defining a coaxial spindle axis about which the spindle rotates;
    a rotor that is disposed within the opening, the rotor having a plurality of blades; and
    a control vane that is mounted aft of the plurality of blades and is pivotable about a vane axis;
    wherein the duct is configured to be coupled to the fuselage forward or aft of a nominal center of gravity of the aircraft and pivotable between a first position, in which thrust from the duct is directed downward, and a second position, in which the thrust is directed rearward, the vane axis being oriented toward the nominal center of gravity of the aircraft when the duct is in the first position;
    wherein the vane axis is not parallel with the spindle axis.

11. The duct of claim 10, further comprising:
    a hub that is at least partially disposed within the opening and that is configured to support the rotor.

12. The duct of claim 11, further comprising:
    an annular spar; and
    a plurality of stators that extend from the hub to the spar.

13. The duct of claim 12, wherein the control vane is mounted to one of the plurality of stators.

14. The duct of claim 13, further comprising:
    a second control vane that is mounted aft of the plurality of blades and that is pivotable about the vane axis.

15. The duct of claim 14, wherein the control vane is mounted to a first one of the plurality of stators and the second control vane is mounted to a second one of the plurality of stators.

16. The duct of claim 15, wherein the control vane and the second control vane are linked together for simultaneous operation.

* * * * *